United States Patent [19]

McCauley

[11] Patent Number: 4,648,293
[45] Date of Patent: Mar. 10, 1987

[54] LOCKNUT AND KEY THEREFOR

[75] Inventor: Lewis D. McCauley, Eggertsville, N.Y.

[73] Assignee: McGard, Inc., Buffalo, N.Y.

[21] Appl. No.: 502,980

[22] Filed: Jun. 10, 1983

[51] Int. Cl.⁴ .............................................. B25B 13/48
[52] U.S. Cl. ........................................ 81/436; 81/451; 411/427
[58] Field of Search ................ 81/90 C, 121 R, 436, 81/451, 461; 411/427

[56] References Cited

U.S. PATENT DOCUMENTS

| | | | |
|---|---|---|---|
| 3,241,408 | 3/1966 | McCauley | 81/436 |
| 3,821,975 | 7/1974 | Haker | 81/461 |
| 3,874,258 | 4/1975 | Semola et al. | 81/121 R |
| 4,038,757 | 8/1977 | Hicks et al. | 81/451 X |

FOREIGN PATENT DOCUMENTS

| | | | |
|---|---|---|---|
| 110624 | 4/1964 | Czechoslovakia | 81/436 |
| 845915 | 5/1939 | France | 81/90 C |

*Primary Examiner*—Frederick R. Schmidt
*Assistant Examiner*—Bradley I. Vaught
*Attorney, Agent, or Firm*—Joseph P. Gastel

[57] ABSTRACT

A combination of a locknut and key therefor, the locknut including a body portion having a face thereon and a curvilinear groove of predetermined configuration in the face, a thread on the body portion, the thread including a frustoconical lead-in portion terminating at an extremely short cylindrical helical thread portion, a key housing having an internally threaded end portion which can be centered on the lead-in portion and thereafter threaded onto the cylindrical threaded portion of the locknut, the key having a key head with a flange of curvilinear configuration for mating engagement with the groove in the locknut, the key head being mounted on a shank on which the housing is rectilinearly slidable, a spring in the housing for biasing the key head toward the locknut when the housing is centered on the the locknut and which forces the flange into the groove as the housing is threaded onto the locknut, and a wrench-receiving head on the shank for turning the key head after the housing is securely mounted on the locknut.

17 Claims, 16 Drawing Figures

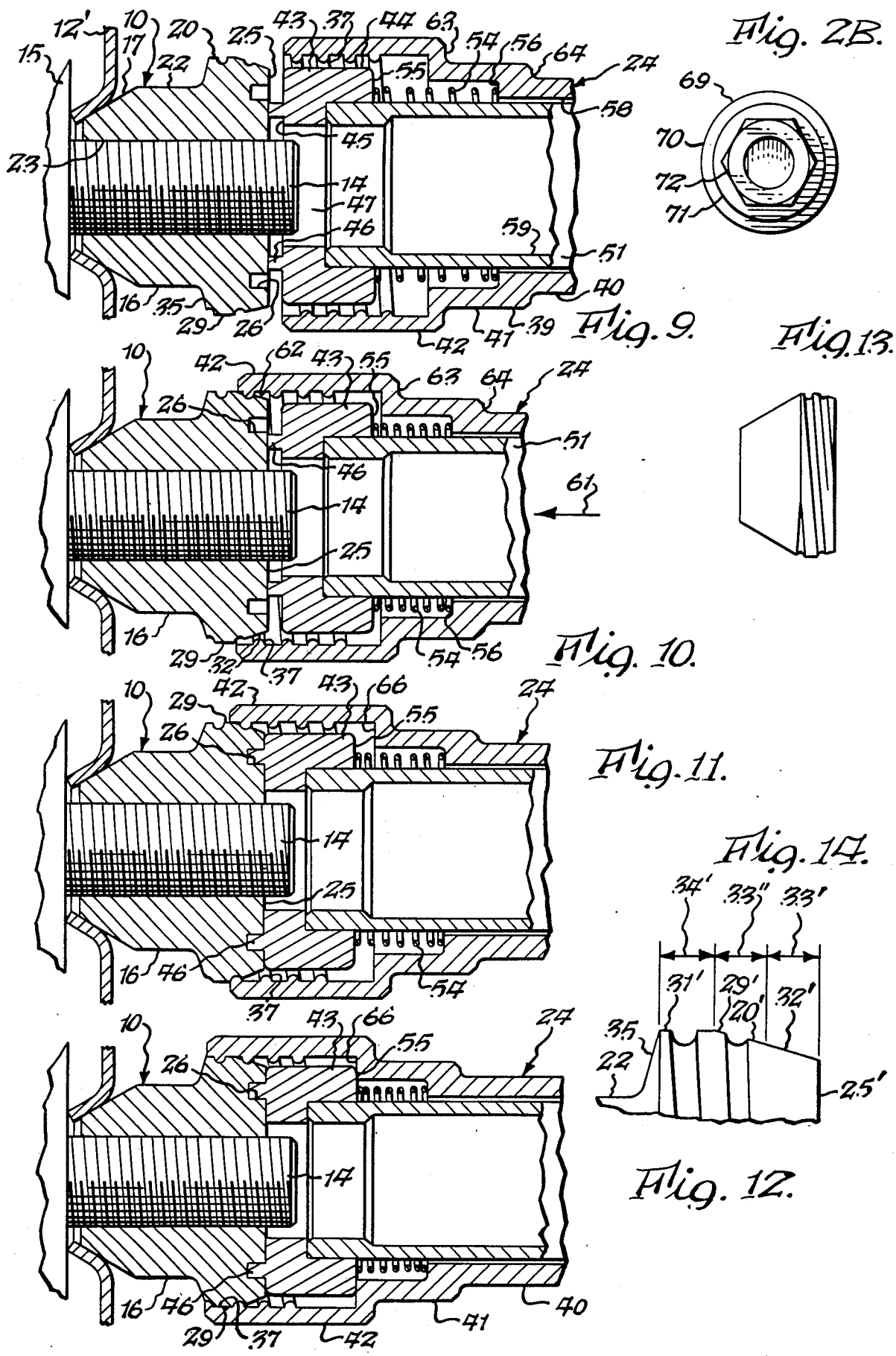

LOCKNUT AND KEY THEREFOR

BACKGROUND OF THE INVENTION

The present invention relates to an improved locknut and key therefor.

By way of background, there are now in common use locknuts and keys of the type shown in U.S. Pat. No. 3,241,408. This locknut is heavier than the conventional nuts used on vehicle rims and therefore may cause an unbalance. Also copending application Ser. No. 318,151, filed Nov. 4, 1981 discloses a locknut and key over which the improved locknut and key of the present invention is an improvement. The nut of the prior copending application has a cylindrical thread thereon which under certain circumstances can be gripped by a pipe wrench. In addition, the key does not automatically align itself with the locknut, and thus digital manipulation is required in this respect. The present invention overcomes the foregoing deficiencies.

SUMMARY OF THE INVENTION

It is accordingly one object of the present invention to provide an improved locknut and key therefor wherein the key can be mounted onto the locknut with a substantially self-centering action.

Another object of the present invention is to provide an improved locknut and key combination which not only achieves the foregoing object, but which also automatically causes the flange on the key to seat within the groove in the locknut incidental to the key mounting operation.

A further object of the present invention is to provide an improved locknut having an outer threaded surface for receiving a key housing, the outer threaded surface essentially being of frustoconical configuration which cannot be turningly engaged by a pipe wrench or the like. Other objects and attendant advantages of the present invention will readily be perceived hereafter.

The present invention relates to a combination of a locknut and key, therefor, said locknut including a locknut body portion having a threaded axial bore therein, a first portion on said locknut body portion for engaging an external member, a face on said locknut body portion extending transversely to said threaded axial bore, a groove of predetermined configuration in said face, a second portion on said locknut body portion including a relatively short substantially cylindrical first helical thread, said key including a key body portion, flange means of said predetermined configuration on said key body portion for reception in said groove, said key including a housing, a second helical thread on said housing for locking engagement with said substantially cylindrical first helical thread, and engagement means on said housing and said key body portion for maintaining said flange means in engagement with said groove when said first and second helical threads are in locking engagement.

The present invention also relates to a locknut comprising a body portion having an internally threaded axial bore, an end portion on said body portion for abutting an external member, a face on said body portion extending transversely to said threaded axial bore, key-receiving means of predetermined configuration on said face for receiving a key, an outer peripheral surface on said body portion coaxial with said internally threaded axial bore, an extremely short cylindrical helical thread on said outer peripheral surface, and a frustoconical lead-in portion leading to said extremely short helical thread whereby the overall general configuration of said outer peripheral surface containing said cylindrical thread is frustoconical.

The present invention also relates to a key for a locknut comprising a body portion, a flange of predetermined configuration on said body portion, a shank mounting said body portion, a housing mounted on said shank, first shoulder means on said housing, second shoulder means on said body portion for engagement by said first shoulder means, and spring means interposed between said housing and said body portion for biasing said body portion away from said first shoulder means.

The present invention also relates to a wheel rim having a central portion and a plurality of nut-receiving depressions therein into which rim-mounting studs extend, a locknut comprising a body portion, an internal thread in said body portion for threadably receiving one of said studs, an external thread on the outside of said locknut for receiving a portion of a locknut-removing key, said external thread lying within said depression, whereby turning access cannot be had thereto by a wrench other than said locknut-removing key which engages said external thread.

The present invention also relates to in combination: a locknut and a decorative cap therefore comprising a body portion having a face at one end thereof and an outer peripheral portion, a groove of predetermined configuration in said face, an external helical thread on said outer peripheral portion, a decorative cap having an outer configuration of an ordinary nut, and an internal helical thread of a complementary configuration to said external thread for mounting on said external thread.

The various aspects of the present invention will be more fully understood when the following portions of the specification are read in conjunction with the accompanying drawings wherein:

BRIEF DESCRIPTION OF THE DRAWINGS

FIG. 2B is a view taken in the direction of arrows 2B—2B of FIG. 2A;

FIG. 9 is a fragmentary cross sectional view showing the initial stage of applying the key to the locknut for tightening or loosening;

FIG. 10 is a view similar to FIG. 9 but showing the key housing advanced to a position wherein the lead-in portion of the threads on the locknut are engaged by the starting portion of the threads on the housing;

FIG. 11 is a view similar to FIG. 10 but showing the housing partially threaded onto the locknut and the key on the housing rotated into mating engagement with the groove on the locknut;

FIG. 12 is a view similar to FIG. 11 but showing the key mounted in its fully installed nut-tightening or loosening position;

FIG. 13 is a side elevational view of a modified form of locknut; and

FIG. 14 is a fragmentary side elevational view of a further modified embodiment of the present invention.

DESCRIPTION OF THE PREFERRED EMBODIMENTS

Figure 1:
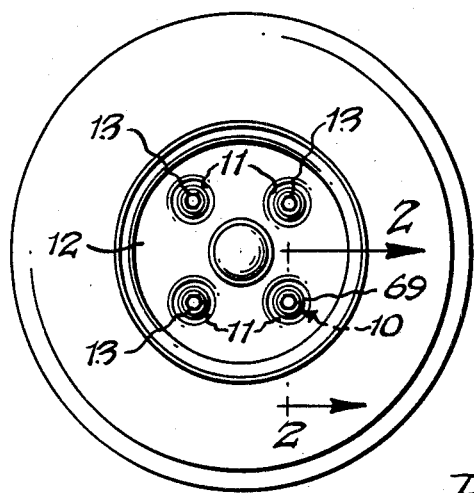
FIG. 1 is a side elevational view of an automotive wheel rim mounted on the axle of an automotive vehicle.

In FIG. 1 the improved locknut 10 of the present invention is shown in mounted relationship within depression 11 of rim 12 which also has conventional rim mounting nuts 13 mounted in other like depressions 11. The locknut 10 and nuts 13 are threaded onto studs, such as 14, which are secured in the conventional manner to vehicle axle 15.

The improved locknut 10 includes a body portion 16 having a substantially frustoconical entry portion or nose 17 at one end for engaging annular rim portion 19 to aid in retaining rim 12 in mounted position. Body portion 16 also includes a threaded portion 20 at the opposite end of body portion 16 from nose portion 17. A central portion 22 is located between portions 17 and 20. It will be appreciated, however, that the axial length of a particular nut, such as 10, may vary in that central portion 22 may be longer or shorter or may be eliminated entirely, the latter being shown in FIG. 13. Extending centrally through body portion 16 is a tapped or internally threaded bore 23 which receives the threaded stud 14 which is mounted on axle 15.

Figures 3, 4:
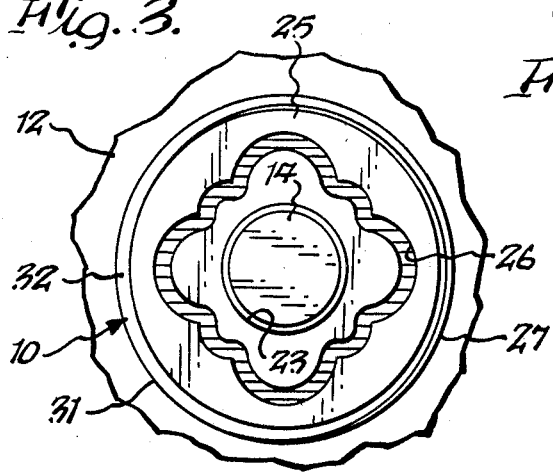
FIG. 3 is a fragmentary view, partially in cross section, of the locknut mounted on a rim mounting stud and showing the key for mounting and demounting the locknut.
FIG. 4 is a view taken in the direction of arrows 4—4 and showing the curvilinear groove in the face of the locknut.

Locknut 10 is for the purpose of preventing the unauthorized removal of rim 12 because locknut 10 cannot be removed by a conventional lug wrench or a conventional pipe wrench or for that matter any other wrench. It can only be removed and installed by the use of special key 24. Only one locknut 10 need be used on each wheel in addition to the conventional nuts 13 inasmuch as rim 12 cannot be removed unless all of the nuts holding it in position are removed. However, if desired, more than one locknut 10 may be used with each wheel. Locknut 10 in this instance is relatively small and it is approximately ¾ of an inch long and has a maximum diameter of approximately 1 inch. As shown in FIG. 3, the various parts of the locknut are essentially drawn to scale. Portion 20 of the locknut has a relatively short axial length. This results in the use of less material than heretofore, which has the advantage that the weight of locknut 10 can be made substantially equal to the weight of conventional nuts 13 which are normally used so that locknut 10 will not create an unbalance in the mounted rim.

Locknut 10 includes a face 25 in which an irregular curvilinear groove 26 is formed. Groove 26 can be made approximately one-half the depth of grooves in conventional locknuts of the type shown in U.S. Pat. No. 3,241,408, issued Mar. 22, 1966, and can be made narrower than conventional grooves because of the fact that the face 25 is of greater diameter than locknuts which were fabricated in the past. The depth of groove 26 may be between about 0.060 and 0.070 inches. The width may be as low as about 1/16 of an inch.

Figures 6, 7:
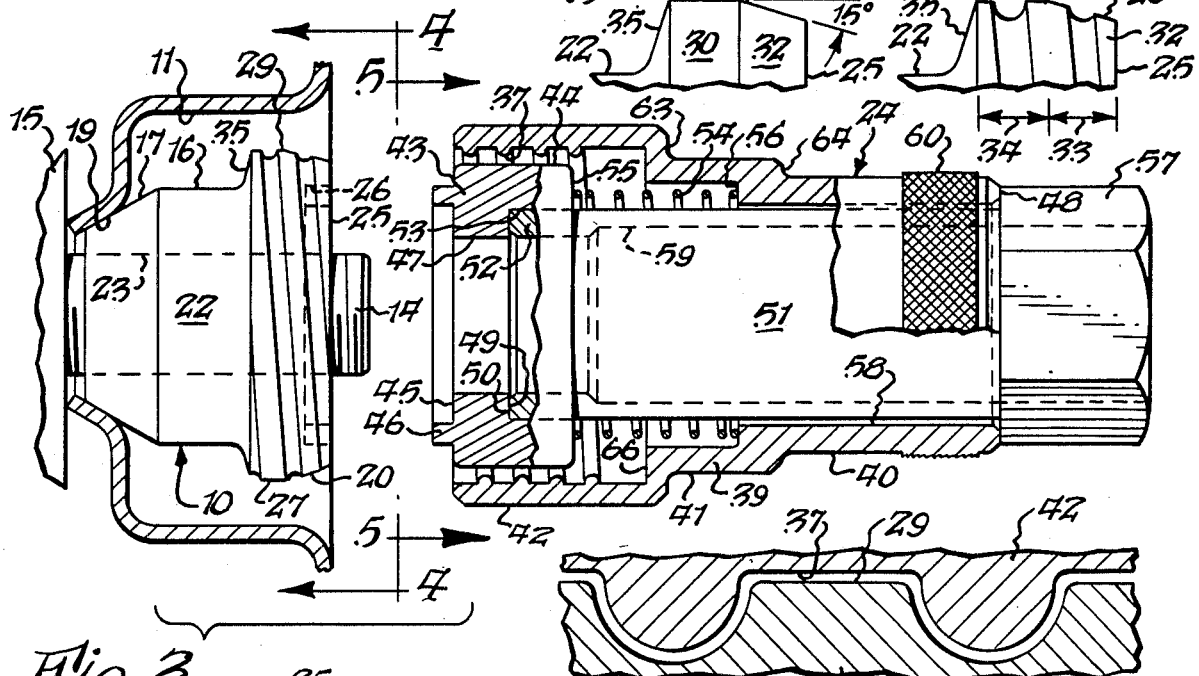
FIG. 6 is a fragmentary side elevational view of the end of the locknut blank on which the thread is formed.
FIG. 7 is a fragmentary side elevational view similar to FIG. 6 but showing the thread formed on the blank of FIG. 6.

The peripheral portion 27 of locknut 10 is located on an end portion 20 of body portion 16 and it includes a helical thread 29. The outer contour of helical thread 29 may best be seen from FIGS. 3, 6 and 7. In this respect, thread 29 is formed on locknut blank 30 (FIG. 6) which shows the configuration of the portion 27 before it is threaded. End portion 20 consists of cylindrical part 31 proximate central nut portion 22 and frustoconical or tapered lead-in nut portion 32 adjacent to cylindrical nut portion 31 as shown. Frustoconical nut portion 32 has a taper of 15° as shown. The thread 29 is started immediately adjacent face 25 and extends throughout nut portions 32 and 31. This thread is thus formed on the tapered surface which extends for the axial length of locknut portion 32, and it continues on for the axial length of cylindrical nut portion 31. The entire length of thread 29 from its very beginning to its very end is approximately 800°, that is, approximately, 2¼ turns. However, the actual length of the portion of thread 29 on cylindrical nut portion 30 is between about 360° and 450°, so that in essence therefore the cylindrical portion of thread 29 is more than one complete turn but less than two, that is, between 360° and 720°. The practical significance of the foregoing is that if an attempt should be made to turn locknut 10 by means of applying a pipe wrench in certain instances, the attempt will be unsuccessful because there will be only a little more than one thread which can be gripped by the pipe wrench. Furthermore, since the thread itself in the specific embodiment shown has a width of only about 3/64 of an inch, there will be pitifully little surface contact between the pipe wrench and the thread. This is because the entire thread 29 from beginning to end has essentially been formed on a frustoconical surface which extends between nut face 25 and annular shoulder 35, and, as is known from prior locknuts of the general type shown in U.S. Pat. No. 3,241,408, a pipe wrench cannot grip a frustoconical surface. The inability for a pipe wrench to grip the outer surface of thread 29 is enhanced by the fact that the locknut is hardened to a hardness of Rockwell C58-60 which is as hard as or harder than the jaws of most pipe wrenches. While the gripping of thread 29 by a pipe wrench is not a problem when the locknut is used in conjunction with a rim having a recess, such as 11, because access cannot be had to the thread 29 by the pipe wrench, the taper on locknut portion 20 becomes significant against gripping by a pipe wrench when it is used with a rim 12' of FIGS. 9-12 which does not have such a recess. Furthermore, the flat surface of the thread 29 (FIG. 8) cannot be jimmied or marred, as would be the case with a conventional thread which comes to a point.

Figures 5, 8:
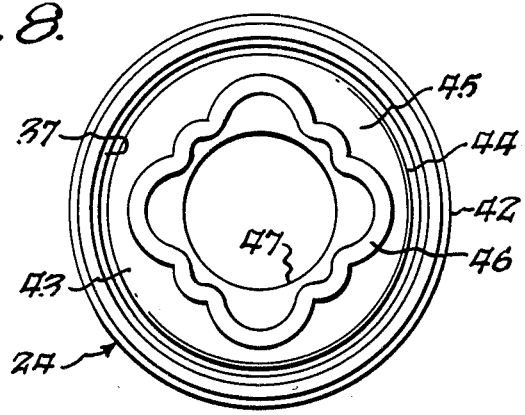
FIG. 5 is a view taken in the direction of arrows 5—5 of FIG. 3 and showing the configuration of the mating flange on the key for entering the groove of the locknut.
FIG. 8 is a fragmentary cross sectional view showing the configurations of the interfitting threads on the key and on the locknut.

The cross sectional contour of thread 29 is shown in FIG. 8, and it has been especially designed so that it can take a very great axial loading even though only slightly more than one thread provides in full depth engagement with a mating thread 37 of key 24. However, it is to be noted that the root diameter of thread 29 is constant throughout its entire length, that is, throughout both the lead-in portion and cylindrical portion. Therefore, thread 29 has partial engagement with cylindrical thread 37 of housing 39 throughout the length of axial distance 33 of the frustoconical portion, and it has full depth engagement throughout the length of axial distance 34 at the cylindrical portion.

Special key 24 is used for mounting and demounting locknut 10 from stud 14. Key 24 includes a housing 39 having a relatively small annular portion 40 which merges into larger intermediate annular portion 41 which merges into a still larger annular end portion 42 in which internal helical thread 37 is located. Thread 37 is uniform throughout its length. Key 24 includes a body portion 43 which is essentially a key head having a substantially cylindrical outer surface 44 and a face 45 on which is formed a flange or ridge 46 (FIGS. 3 and 5) of a curvilinear configuration for reception in and mating engagement with groove 26 (FIG. 4). Key head or body portion 43 has a central bore 47 into which the end of stud 14 can fit. Key head 43 also includes an annular shoulder 49 which is abutted by the end 50 of cylindrical annular shank 51, the end 52 of which is pressfitted into cylindrical bore 53 after housing 39 has been mounted on shank 51 with helical spring 54 having one end bearing on annular surface 55 of key head 43 and the other end bearing on annular shoulder 56 within housing 39. A hexagonal head 57 is formed integrally with shank 51 for receiving a suitable wrench for turning shank 51 and thus turning key head 43. A bore 59 extends completely throughout the length of shank 51 to accommodate any length of stud 14. An annular knurled portion 60 is located on housing portion 40 to facilitate grasping of the housing for turning it. There is a rectilinear sliding fit between shank 51 and internal surface 58 of housing 39. Hexagonal head 57 abuts housing end 48 to limit the movement of shank 51 to the left under the bias of spring 54.

The steps which are followed in using key 24 are depicted in FIGS. 9–12. The first step is to press curvilinear ridge or flange 46 against face 25 of nut 10, as shown in FIG. 9. Thereafter, housing 39 is moved to the left in the direction of arrow 61 (FIG. 10) so that tapered lead-in portion 32 of nut 10 enters the end portion 62 of key housing portion 42. The entry is facilitated by the fact that lead-in portion 32 is tapered. During this portion of the mounting operation, the housing 39 may be grasped at annular shoulder 63 or annular shoulder 64 or on knurled portion 60. When the housing 39 has moved as far to the left as it can in FIG. 10, spring 54 will be compressed to the condition of FIG. 10 from its normal expanded condition of FIG. 9. Thereafter, housing 39 is rotated in a clockwise direction, when viewed from the right of FIG. 10, and this will cause threads 37 of the housing to move into threaded engagement with thread 29. During the initial portion of the rotation, the outer surface of flange 46 may still be bearing against face 25 of locknut 10. However, as housing 39 is rotated, there will be frictional engagement between the right end of spring 54 and shoulder 56, and there also will be frictional engagement between the left end of spring 54 and face 55 of head 43. This will cause head 43 to rotate with housing 39 and thus flange 46 will be biased into mating engagement with groove 26, as shown in FIG. 11, by the expansion of spring 54. Continued rotation of housing 39 will cause housing portion 42 to move to the position shown in FIG. 12 wherein annular shoulder 66 bears against surface 55 of key head 43 to thereby maintain curvilinear flange 46 in good tight locking engagement in groove 26. Thereafter, a suitable wrench can be applied to hexagonal head 57 to turn shank 51 and head 43 in a counterclockwise direction as viewed from the right of FIG. 12 to thereby unscrew locknut 10 from stud 14. After nut 10 has been completely unthreaded from stud 14, it can be removed from locking engagement with key 24 by merely rotating the housing and the locknut relative to each other in an unthreading direction.

In order to install nut 10 onto a stud 14, all that is necessary is to mount the nut 10 onto the stud with the fingers and thereafter mount the key onto the nut in the same manner as described above relative to FIGS. 9, 10 and 11 and thereafter continue turning housing 39 in a locknut tightening direction and thereafter apply a wrench to hexagonal head 57. Key 24 can then be removed from locking engagement with locknut 10 by merely rotating housing 39 in a counterclockwise direction as viewed from the right in FIG. 10. It is to be noted that the thickness of housing portion 42 is such that it can easily fit within depression 11, in the event that a rim, such as 12, is used.

Figure 2:
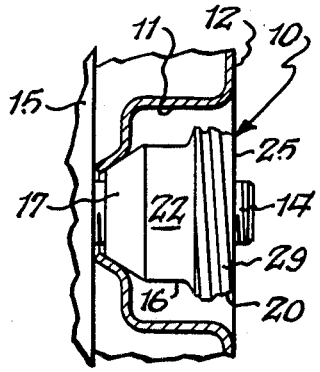
FIG. 2 is a fragmentary enlarged cross sectional view taken substantially along line 2—2 of FIG. 1.
Figure 2A:
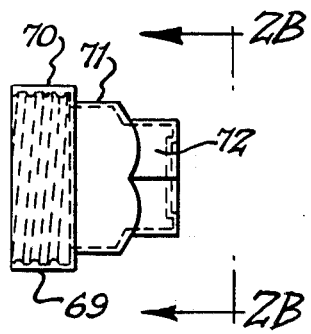
FIG. 2A is a side elevational view of a decorative cap for mounting on the locknut of FIG. 2.

A decorative cap 69 (FIGS. 2A and 2B) of molded plastic may be provided to cover locknut 10. Decorative cap 69 includes an annular cylindrical internally threaded portion 70 for mating engagement with thread 29, a cylindrical central portion 71, and a hexagonal head 72 attached to central portion 71. Decorative cap 69 is in the shape of the lug nuts 13 which are conventionally used with the wheel, so that decorative cap 69 looks exactly like the lug nuts 13. Cap 69 may be silvered or may have any other suitable color applied thereto as desired. Cap 69 can be removed by means of a wrench or by means of the fingers of a person, if it is sufficiently loose, to permit access to nut 10 for loosening purposes.

In FIG. 14 a further modified embodiment of the present invention is shown which may be identical in all respects to locknut 10 described above except that the outer portion 32' of frustoconical end 20' adjacent face 25' is unthreaded for the axial distance 33' and the thread 29' starts on the frustoconical portion 20' and extends for the axial distance 33" and then continues onto the cylindrical portion 31' for the axial distance 34'. In other words, the main difference between the embodiment of FIG. 14 and locknut 10 is the unthreaded extreme outer frustoconical end portion 32' of FIG. 14.

While preferred embodiments of the present invention have been disclosed, it will be appreciated that the present invention is not limited thereto, but may be otherwise embodied within the scope of the following claims.

What is claimed is:

1. In combination a locknut and a key therefor, said locknut including a locknut body portion having a threaded axial bore therein, a first portion on said locknut body portion for engaging an external member, a face on said locknut body portion extending transversely to said threaded axial bore, a groove of predetermined configuration in said face, a second portion on said locknut body portion including a relatively short substantially cylindrical first helical thread, a relatively steep lead-in portion to said first helical thread on said locknut body portion, and a second helical thread with a gradually increasing outer diameter on said lead-in portion, said key including a key body portion, flange members of said peredetermined configuration on said key body portion for reception in said groove, said key including a housing, a third helical thread on said housing for locking engagement with said substantially cylindrical first and second helical threads, and engagement means on said housing and said key body portion for maintaining said flange means in engagement with said groove when said first and second and third helical threads are in locking engagement.

2. In combination a locknut and key therefor as set forth in claim 1 wherein said relatively short cylindrical thread is of a length of between about 360° and 450°.

3. In combination a locknut and a key therefor as set forth in claim 1 wherein said combination of said second helical thread on said relatively steep lead-in portion and said substantially cylindrical first helical thread has an overall general frustoconical configuration.

4. In combination a locknut and a key therefor as set forth in claim 1 including a portion on said housing at the beginning of said third helical thread for engaging said lead-in portion to thereby align said housing relative to said locknut.

5. In combination a locknut and a key therefor as set forth in claim 1 wherein said relatively short cylindrical helical thread is of a length less than about 720°.

6. In combination a locknut and a key therefor as set forth in claim 1 wherein said relatively short cylindrical helical thread is of a length of between about 360° and 720°.

7. In combination a locknut and a key therefor as set forth in claim 3 wherein said substantially cylindrical first helical thread and said second helical thread each have substantially the same root diameter whereby there is partial engagement between said third helical thread and said second helical thread and there is full engagement between the substantially cylindrical first helical thread and said third helical thread.

8. In combination a locknut and a key therefor as set forth in claim 1 wherein said key includes a shank mounting said key body portion, means mounting said shank for axial sliding movement in said housing, and spring means effectively interposed between said housing and said key body portion for biasing said key body portion toward said locknut when said flange is in engagement with said face.

9. In combination a locknut and a key therefor as set forth in claim 8 including a wrench-receiving head on the opposite end of said shank from said key body portion.

10. In combination a locknut and a key therefor as set forth in claim 8 wherein said engagement means comprise a first shoulder on said housing and a second shoulder on said key body portion.

11. In combination a locknut and a key therefor as set forth in claim 10 wherein said threaded axial bore contains threads of the same hand as said first helical thread.

12. A locknut comprising a body portion having an internally threaded axial bore, an end portion on said body portion for abutting an external member, a face on said body portion extending transversely to said threaded axial bore, key-receiving means of predetermined configuration on said face for receiving a key, an outer peripheral surface on said body portion coaxial with said internally threaded axial bore, an extremely short cylindrical helical thread on said outer peripheral surface, a frustoconical lead-in portion leading to said extremely short helical thread to cause the overall general configuration of said outer peripheral surface to be frustoconical, and an extension of said helical thread onto said frustoconical lead in portion, said helical thread and said extension having substantially the same root diameter, and said extension having a gradually increasing outer diameter.

13. A locknut as set forth in claim 12 wherein said key-receiving means of predetermined configuration comprise a groove.

14. A locknut as set forth in claim 12 wherein said helical thread is of the same hand as said internally threaded axial bore.

15. A locknut as set forth in claim 12 wherein extremely short helical thread is less than about 720° long.

16. A locknut as set forth in claim 12 wherein said relatively short cylindrical thread is of a length of between about 360° and 450°.

17. A locknut as set forth in claim 12 wherien said extremely short helical thread is between about 360° and 720°.

* * * * *